United States Patent
Wu et al.

(10) Patent No.: US 8,234,279 B2
(45) Date of Patent: Jul. 31, 2012

(54) STREAMING TEXT DATA MINING METHOD AND APPARATUS USING MULTIDIMENSIONAL SUBSPACES

(75) Inventors: Yuan-Jye Wu, Issaquah, WA (US); Anne S-W Kao, Bellevue, WA (US); Stephen R. Poteet, Bellevue, WA (US); William Ferng, Sammamish, WA (US); Robert E. Cranfill, Seattle, WA (US)

(73) Assignee: The Boeing Company, Chicago, IL (US)

( * ) Notice: Subject to any disclaimer, the term of this patent is extended or adjusted under 35 U.S.C. 154(b) by 559 days.

(21) Appl. No.: 11/246,195

(22) Filed: Oct. 11, 2005

(65) Prior Publication Data

US 2007/0083509 A1   Apr. 12, 2007

(51) Int. Cl.
    G06F 7/00    (2006.01)
    G06F 17/00   (2006.01)
(52) U.S. Cl. ........... 707/737; 707/736; 707/739; 706/45
(58) Field of Classification Search .............. 707/3, 4, 707/5, 6, 736, 737, 739; 715/500; 706/45
See application file for complete search history.

(56) References Cited

U.S. PATENT DOCUMENTS

| | | | |
|---|---|---|---|
| 4,259,661 A * | 3/1981 | Todd ........................... 382/205 |
| 6,081,900 A * | 6/2000 | Subramaniam et al. ........ 726/19 |
| 6,401,086 B1 | 6/2002 | Bruckner |
| 6,424,362 B1 | 7/2002 | Bornstein |
| 6,473,753 B1 * | 10/2002 | Katariya et al. ..................... 1/1 |
| 6,560,597 B1 * | 5/2003 | Dhillon et al. ................... 707/4 |
| 6,611,825 B1 | 8/2003 | Billheimer |
| 6,701,305 B1 | 3/2004 | Holt et al. ........................ 706/45 |
| 2002/0052901 A1 | 5/2002 | Guo |
| 2003/0030678 A1 | 2/2003 | Rosenholtz |
| 2003/0172357 A1 | 9/2003 | Kao et al. ....................... 715/529 |
| 2003/0225749 A1 * | 12/2003 | Cox et al. ........................... 707/3 |
| 2005/0049867 A1 | 3/2005 | Deane |

OTHER PUBLICATIONS

Booker et al., Visualizing Text Data Sets, 1999, IEEE Computing in Science & Engineering, pp. 26-35.*
Yuan-Jye Wu, "Bases and Projection," PowerPoint slide describing projection onto a subspace, created approximately Aug. 2009.
Hovy et al., "Automated Text Summarization and the Summarist System," Annual Meeting of the ACL Proceedings of a workshop on held at Baltimore, Maryland: Oct. 13-15, 1998, Session: pp. 197-214, 1998, Association for Computational Linguistics, Morristown, NJ, USA.

* cited by examiner

*Primary Examiner* — Vincent Boccio
*Assistant Examiner* — Huen Wong

(57) ABSTRACT

A streaming text data comparator performs real-time text data mining on streaming text data. The comparator receives a streaming text data document and generates a vector representation of the term frequencies relating to an existing document collection. The comparator then transforms the term frequency vector into a projection in a precomputed multidimensional subspace that represents the original document collection. The comparator further calculates a relationship value representing the similarities or differences between the vector representation and the subspace, and compares the relationship value to a predetermined threshold to determine whether the streaming text data document is related to the original document collection. If the streaming text data document is related, the streaming text data comparator intercalates the new document into the document collection. If the new document is not related, the comparator may store or delete the unrelated document.

31 Claims, 4 Drawing Sheets

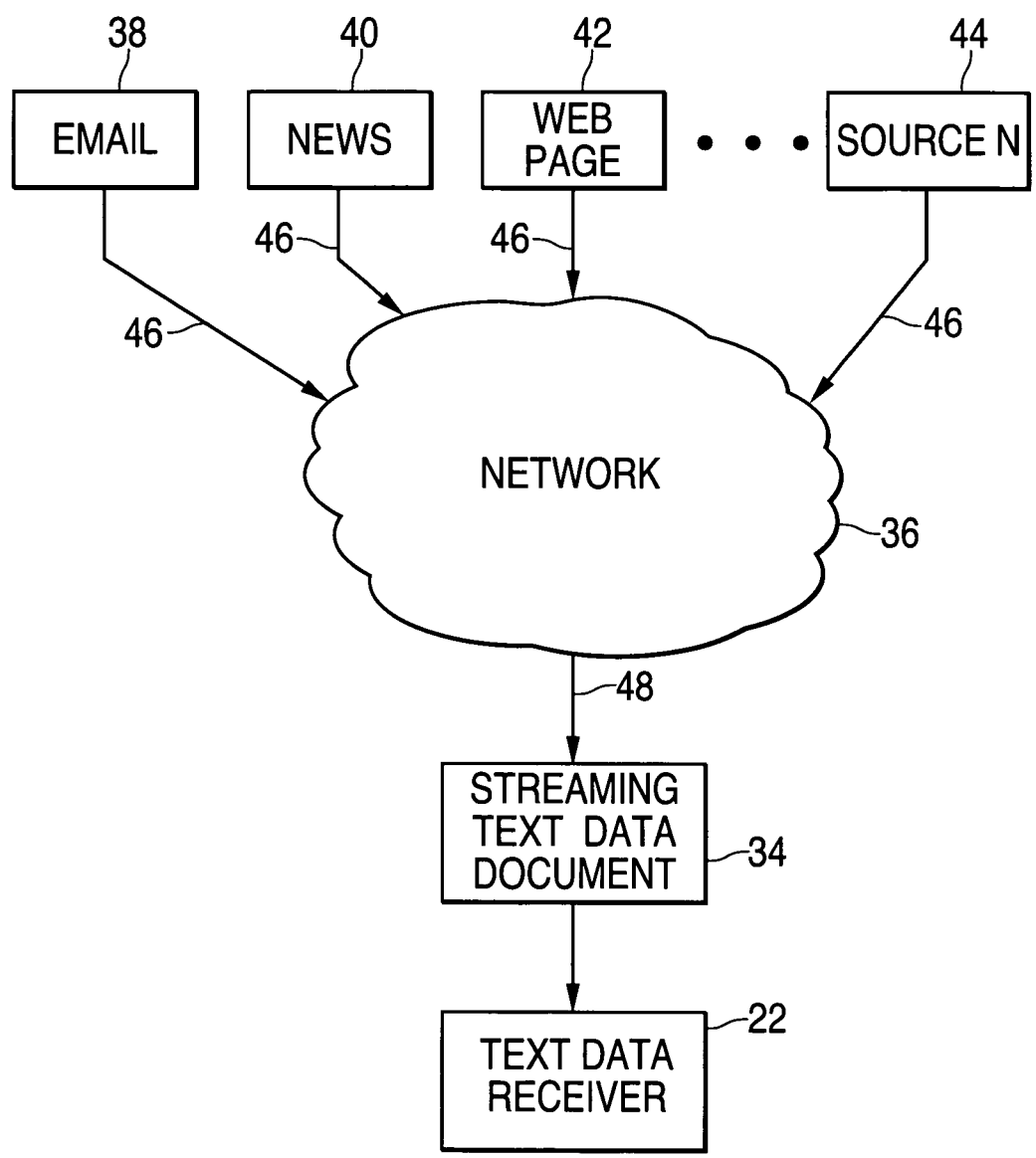

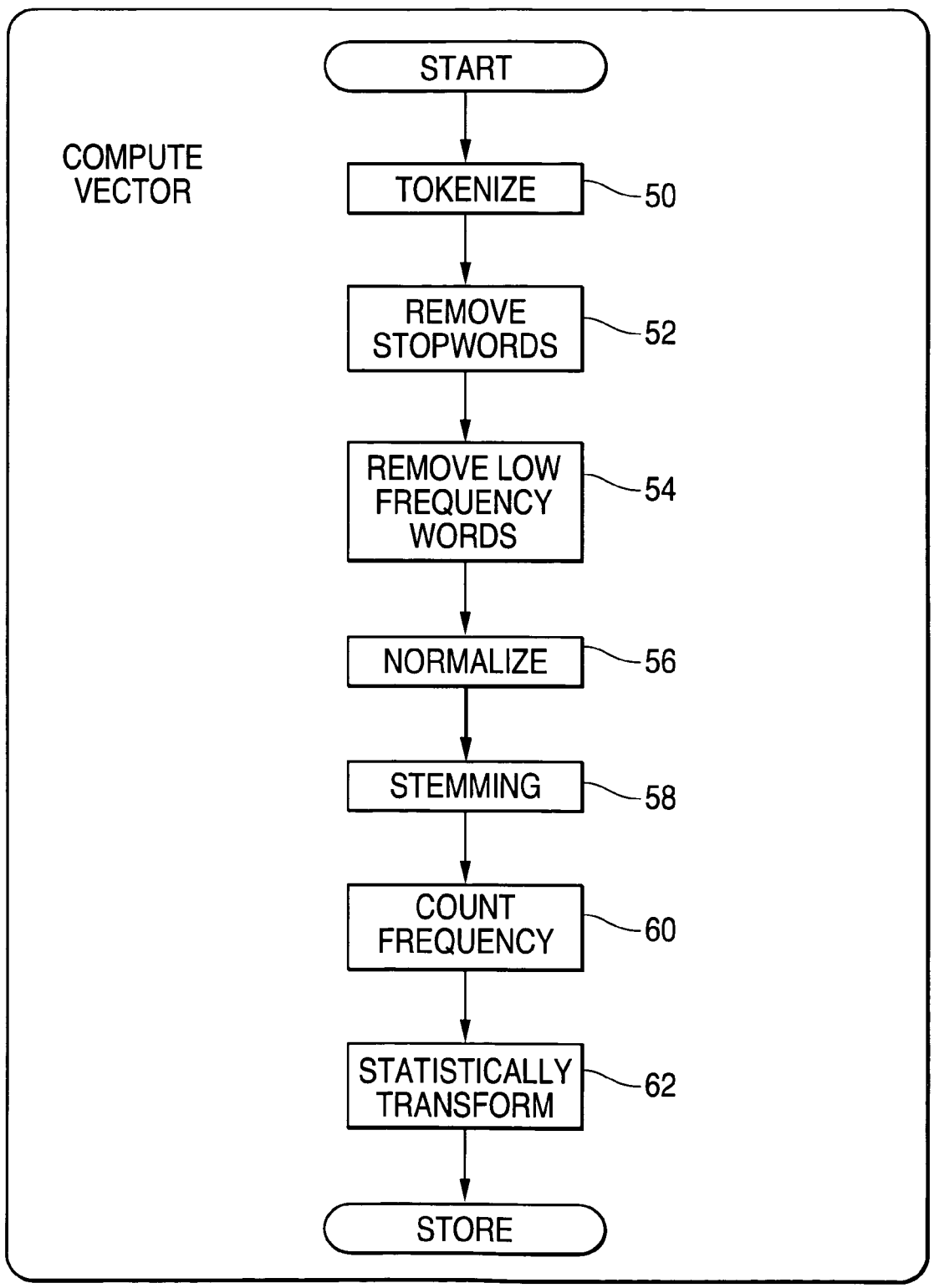

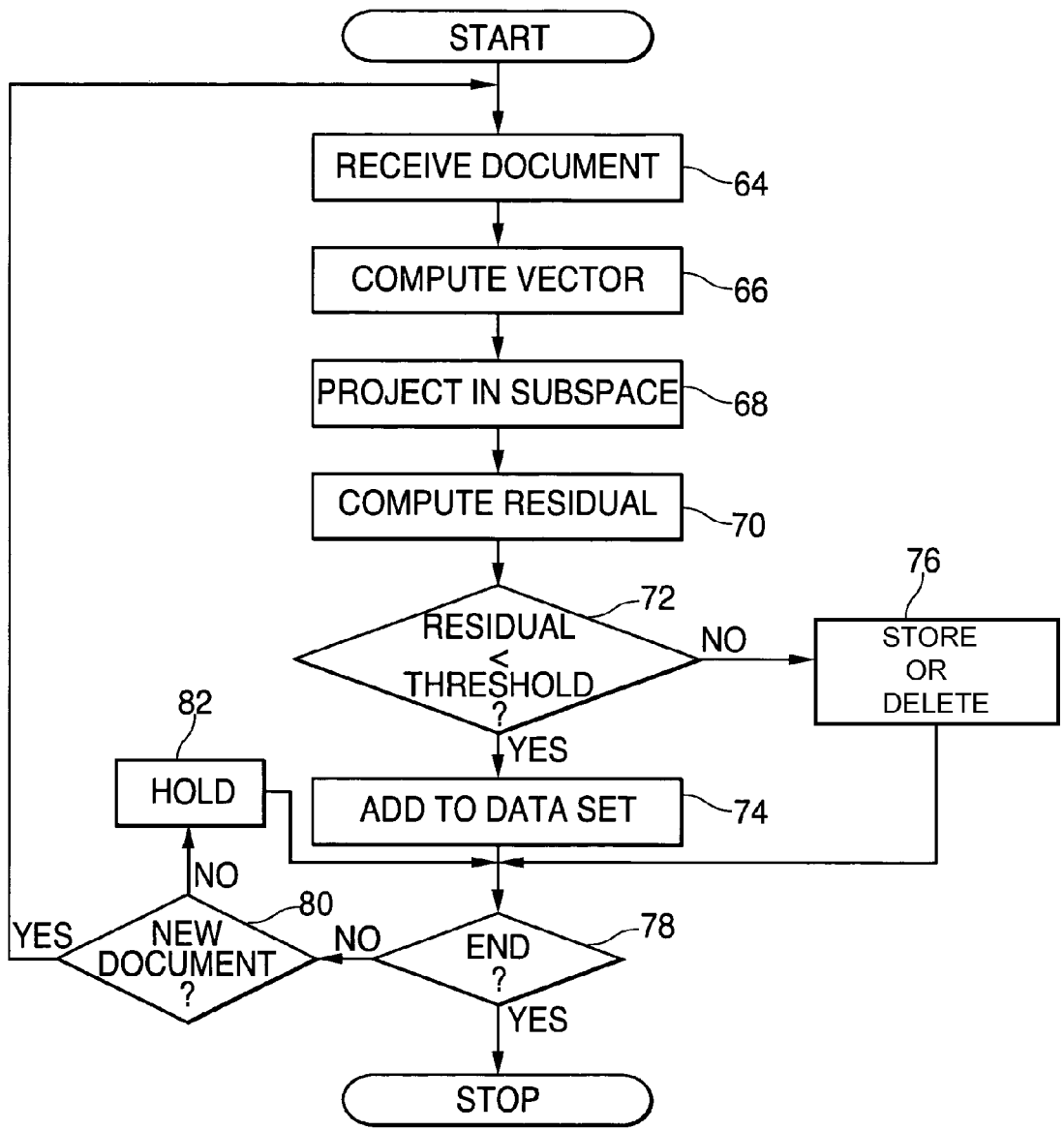

STREAMING TEXT DATA MINING METHOD AND APPARATUS USING MULTIDIMENSIONAL SUBSPACES

FIELD OF THE INVENTION

The present invention relates generally to data processing. More particularly, the present invention relates to data mining, for example, analyzing streaming text data with regard to an existing set of documents.

BACKGROUND OF THE INVENTION

Data mining broadly seeks to expose patterns and trends in data, and most data mining techniques are sophisticated methods for analyzing relationships among highly formatted data, such as numerical data or data with a relatively small fixed number of possible values. However, a vast amount of information consists of textually-expressed information, including many database fields, reports, memos, e-mail, web sites, and external news articles of interest to managers, market analysts, and researchers.

Text mining is an extension of the general notion of data mining in the area of free or semi-structured text. In comparison to data mining, text data analysis (also referred to as "text mining," or simply "text analysis") refers to the analysis of text, and may involve such functions as text summarization, information visualization, document classification, document clustering, document summarization, and document cross-referencing. Thus, text data analysis may help a knowledge worker find relationships between individual unstructured or semi-structured text documents and semantic patterns across large collections of such documents.

Research in the area of text mining has its roots in information retrieval, which began around 1960, when researchers started to systematically explore methods to match user queries to documents in a database. However, recent advances in computer storage capacity and processing power, coupled with massive increases in the amount of text available on-line, have resulted in a new emphasis on applying techniques learned from information retrieval to a wider range of text mining problems. Generally speaking, text mining requires the ability to automatically assess and characterize the similarity between two or more sources of text.

In general, text mining depends on the twin concepts of "document" and "term." As used in this disclosure, a "document" refers to any body of free or semi-structured text. The text can include the entire content of a document in its general sense, such as a book, an article, a paper, or the like or a portion of a traditional document, such as an abstract, a paragraph, a sentence, or a phrase, for example, a title. Ideally, a "document" describes a coherent topic. In addition, a "document" can encompass text generated from an image or other graphics, as well as text recovered from audio or video formats.

On the other hand, a document can be represented as collections of "terms," each of which can appear in multiple documents. In some cases, a "term" can consist of an individual word used in the text. However, a "term" can also include multiple words that are commonly used together, for example, "landing gear." Furthermore, the "terms" used to represent a portion of text need not explicitly appear in the text. Thus, the "terms" selected to represent a document may be obtained, for example, by applying acronym or abbreviation expansion, word stemming, spelling normalization, thesaurus-based substitutions, or many other techniques. Selecting the best set of "terms" to represent a given document generally will depend upon the particular document, or a collection to which the document belongs, as well as the specific goals of the text mining activity.

Once a suitable set of terms has been defined for a document collection, the collection can be represented as a vector space. With respect to traditional vector space methods, individual documents are treated as vectors in a high-dimensional vector space in which each dimension corresponds to some feature of a document. A collection of documents can thus be represented by a two-dimensional matrix $D_{(t,d)}$ of features and documents. In the typical case, the features correspond to document terms, and the value of each term is the frequency of that term in the specified document. For example, if term $t_1$ occurs four times in document $d_1$, then $D_{(1,1)}$ is set to 4. Similarly, if term $t_2$ does not occur in $d_1$, then $D_{(2,1)}$ is set to 0. More complex types of vector space methods, such as latent semantic indexing (LSI), involve methods of transforming D, e.g. singular value decomposition (SVD) or semi-discrete decomposition (SDD), which typically attempt to provide a more sophisticated set of features and a better measure of the importance of each feature in a document.

By representing documents as vectors in a feature space, similarities between documents can be evaluated by computing the distance between the vectors representing the documents. A cosine measure is commonly used for this purpose, but other distance measures can be used.

The advantages of the vector space method are that it provides a simple and uniform representation of documents and queries, can accommodate many variations appropriate to different document collections, and has been shown to perform relatively well in information retrieval applications. In addition, representing documents as vectors could be useful for all other text mining operations. However, the performance of the basic vector space method is severely limited by the size of D. In actual document collections, both the number of documents and the number of terms are typically quite large, resulting in a large D, and making the necessary distance calculations prohibitively slow. It is possible to alleviate this problem by preselecting a subset of all possible terms to use in the matrix, but this can degrade information retrieval performance and limit text mining capability. Finally, while the traditional vector space method provides a way of assessing the similarities between documents, it alone does not provide a good way to visualize these relationships or summarize documents.

As disclosed in U.S. Pat. No. 6,611,825, an improved vector space method has been developed that allows the user to efficiently perform a variety of text mining operations including information retrieval, term and document visualization, term and document clustering, term and document classification, summarization of individual documents in groups of documents, and document cross-referencing. In this technique, the document collection is represented using a subspace transformation based on the distribution of the occurrence of terms in the documents of the document collection. In particular, a term-by-document frequency matrix D is initially constructed that catalogs the frequencies of the various terms for each of the documents.

Next, the term-by-document matrix can be preprocessed to define a working matrix A by normalizing the columns of the term-by-document matrix D to have a unit sum, stabilizing the variance of the term frequencies via a nonlinear function and then centering the term frequencies with respect to the mean vector of the columns. This preprocessing is denoted as $A = f(D) - ce^T$ in which c is the mean of the columns of $f(D)$ and e is a d-vector whose components are all equal to one, so that the average of the columns of A is now zero. Each $ij^{th}$ entry in A is therefore a score indicating the relative occurrence of the $i^{th}$ term in the $j^{th}$ document. Traditionally, $f$ is defined as a two-sided weighting function, i.e., $$f(D)=(W_t D)W_d$$

wherein $W_t$ and $W_d$ are two diagonal scaling matrices for weighing terms and documents, respectively, as known to those skilled in the art.

To capture some of the semantics latent in the documents, i.e., to capture similarity of content despite variations in word usage such as the use of synonyms, the working matrix A is orthogonally decomposed to obtain a rank-k matrix $A_k$ that approximates A. In this regard, the orthogonal decomposition of the working matrix A can be performed with a number of decompositional techniques, such as a two-sided orthogonal decomposition.

By way of example, one typical two-sided orthogonal decomposition is a truncated URV (TURV) decomposition. For a given dimensionality k, the TURV computes bases of subspaces with high information content (matrices $U_k$ and $V_k$ with orthonormal columns) satisfying the equation:

$$AV_k = U_k R_k,$$

wherein $R_k$ is a triangular matrix of order k. Then an approximate term-document matrix $A_k$ is defined as:

$$A_k = U_k R_k V_k^T$$

For the approximation $A_k$, as well as for A, each row corresponds to a term and each column corresponds to a document. The $ij^{th}$ entry of $A_k$ therefore provides a relative occurrence of the $i^{th}$ term in the $j^{th}$ document, but this relative occurrence has now been filtered by the approximation which captures semantics latent in the documents. More specifically, the factor $U_k$ captures variations in vocabulary, while the factor $V_k^T$ brings out latent structure in the corpus of documents.

Accordingly, it is desirable to provide a method and apparatus that can be used in conjunction with a multidimensional subspace representation of an existing set of documents to analyze newly arriving streaming text data with regard to the content of the existing set of documents.

SUMMARY OF THE INVENTION

The foregoing needs are met, to a great extent, by the present invention, wherein in one aspect an apparatus is provided that in some embodiments can analyze streaming text data in real time or near real time in comparison to an existing set of documents by projecting a vector representation of the streaming text data into a multidimensional subspace representing semantic relationships in the set of documents.

In accordance with one aspect of the present invention, a method of comparing a unit of streaming text data to an existing document collection can include computing a vector representation of the unit of streaming text data, transforming the vector representation into a projection in a predetermined vector subspace, and calculating a relationship value indicative of the relationship between the vector representation and the subspace.

In accordance with another aspect of the present invention, a computer program product for comparing a unit of streaming text data to an existing document collection can include a computer-readable medium encoded with instructions configured to be executed by a processor in order to perform predetermined operations. The predetermined operations can include computing a vector representation of the unit of streaming text data, transforming the vector representation into a projection in a predetermined vector subspace, and calculating a relationship value indicative of the relationship between the vector representation and the subspace.

In accordance with yet another aspect of the present invention, a streaming text data comparator can include a streaming text data vectorizer configured to compute a vector representation of a unit of streaming text data, a vector projector configured to transform the vector representation into a projection in a predetermined vector subspace, and a relationship calculator configured to calculate a relationship value between the vector representation and the subspace.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 2 is a schematic diagram illustrating sources of streaming text data documents that can be received by the streaming text data comparator of FIG. 1.

FIG. 3 is a flowchart illustrating the steps that may be followed to compute a vector representation of a streaming text data document.

FIG. 4 is a flowchart illustrating steps that may be followed in accordance with one embodiment of the method or process.

DETAILED DESCRIPTION

Figure 1:
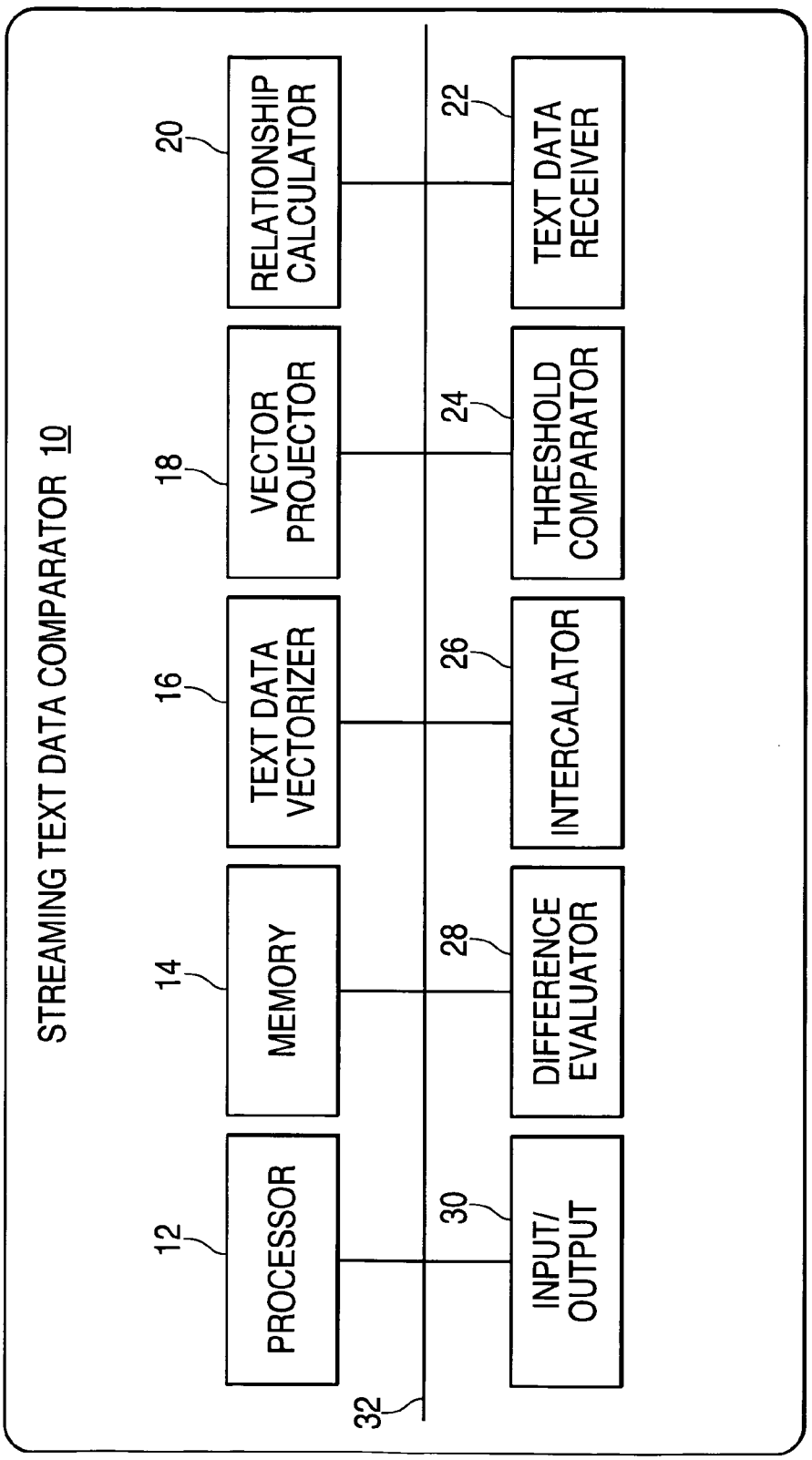
FIG. 1 is a block diagram depicting a streaming text data comparator according to a preferred embodiment of the invention.

An embodiment in accordance with the present invention provides a streaming text data comparator that can receive streaming text data from various sources and perform real-time or near real-time text data mining on the streaming text data. The streaming text data comparator can analyze the streaming text data and compare it to an existing document collection as represented by a multidimensional subspace. The streaming text data comparator can include a streaming text data receiver to receive the data, and a text data vectorizer that can compute a vector representation of the term frequencies in a streaming text data document.

The streaming text data comparator also can include a vector projector that transforms the vector representation into a projection in the previously determined multidimensional term subspace representing the existing document collection, and a relationship calculator that can calculate a relationship value relating the vector representation of the document to the existing document collection. The streaming text data comparator can further include a threshold comparator that can compare the relationship value to a predetermined threshold value in order to determine whether the newly received streaming text data document is related to the existing document collection. If the new document is related, the new document can be added, or intercalated, into the existing document collection as a projected vector in the multidimensional term subspace. If the new document is not related, the streaming text data comparator can store or set aside the document for possible future processing.

Throughout this disclosure, the term "document" is used broadly to signify a unit of streaming text data, which is inclusive of merely a portion of a document, such as a section, a paragraph, or a phrase. Use of both the terms "document" and "section of a document" is not meant to distinguish between an entire document and a section of a document, but rather to emphasize, in places, that text including less than a whole document may apply and is expressly included, even though implicitly included throughout the disclosure. In addition, the term "document" can encompass text generated from an image or other graphics, as well as text generated from audio, video other multimedia formats.

The term "streaming text data" is used broadly throughout this disclosure to signify any text data that is capable of being transmitted or received over a discrete period of time. Thus, as used in this disclosure, "streaming" does not necessarily indicate a more specific or narrow meaning—such as "continuous" or "dynamic"—although more specialized meanings, significations or interpretations should be understood to be encompassed by the term "streaming" as used in this disclosure.

Similarly, the term "real time" or "real-time" is used broadly throughout this disclosure to signify substantially, approximately, on average or nearly at a rate equivalent to a transmission rate of the data. However, as used in this disclosure, "real time" or "real-time" should not be strictly construed to indicate a literal equivalency of rates or a nonexistence of delay, although more literal meanings, significations or interpretations should be understood to be encompassed by the term "real time" or "real-time" as used in this disclosure.

The invention will now be described with reference to the drawing figures, in which like reference numerals refer to like parts throughout. An embodiment in accordance with the present invention provides a streaming text data comparator for real-time mining of streaming text data using multidimensional subspace representations of an existing document collection. FIG. 1 illustrates a preferred embodiment of the streaming text data comparator 10 including a processor 12, a memory 14, a text data vectorizer 16, a vector projector 18, a relationship calculator 20, a text data receiver 22, a threshold comparator 24, and intercalator 26, and an input/output device 30, all of which are interconnected by a data link 32. The steaming text data comparator 10 can compare a newly arriving unit of streaming text data with an existing document collection, including a plurality of text documents previously acquired, selected, known, or otherwise available. Generally, the document collection will consist of a group of related documents with common or similar subject matter.

The processor 12, the memory 14 and the input/output device 30 can be part of a general computer, such as a personal computer, a server or a mainframe computer. The remaining components can include programming code, such as source code, object code or executable code, stored on a computer readable medium that can be loaded into the memory 14 and processed by the processor 12 in order to perform the desired functions of the streaming text data comparator 10.

As illustrated in FIG. 2, the text data receiver 22 can be configured to receive streaming text data from a variety of sources. In a preferred embodiment the text data receiver 22 receives a streaming text data document 34 over a communication network 36. In various embodiments, the network 36 can include any viable combination of devices and systems capable of linking computer-based systems, such as the Internet, an intranet or extranet, a local area network (LAN), a wide area network (WAN), a direct cable connection; a private network; a public network; an Ethernet-based system; a token ring; a value-added network; a telephony-based system, including T1 or E1 devices; an Asynchronous Transfer Mode (ATM) network; a wired system; a wireless system; an optical system; a combination of any number of distributed processing networks or systems, or the like.

In a preferred embodiment, the various sources of text streaming documents can be linked to the network 36 by way of local data links 46. Similarly, a local data link 48 can link the network 36 to the text data receiver 22. In various embodiments the local links 46 and 48 may incorporate any combination of devices, as well as any associated software or firmware, configured to couple processor-based systems, including modems, network interface cards, serial buses, parallel buses, LAN or WAN interfaces, wireless or optical interfaces and the like, along with any associated transmission protocols, as may be desired or required by the design.

Typical sources of streaming text data documents can include any document of interest, such as an email 38, a news article 40, a website document, or web page 42, or the like, which can be stored on Internet servers; corporate, institutional, or governmental databases; and any other type of document repository that can be accessed. Streaming text data mining can be used in a wide variety of applications, including, but not limited to, such activities as intelligence gathering, marketing research, academic research, logistics and data management.

These various sources of electronic text data on the network 36 can be received by the text data receiver 22 by way of a data link 48. Furthermore, the text data receiver 22 can receive streaming text data in any of numerous electronic protocols. For example, the text data receiver 22 can receive electronic text data in hypertext transfer protocol (HTTP), secure hypertext transfer protocol (HTTPS), network news transfer protocol (NNTP), post office protocol (POP), internet message protocol (IMAP), file transfer protocol (FTP), internet relay chat protocol (IRC), or a proprietary protocol. The multiple sources of text data can be aggregated into a continuous source of streaming text data.

Returning to FIG. 1, the streaming text data comparator 10 can further include a text data vectorizer 16 that computes a vector representation, such as a term frequency vector, using a unit of streaming text data, such as a document. FIG. 3 illustrates in detail a process that can be performed by the text data vectorizer 16, which can generate a term list and compute a vector representation of the streaming text data document 34. The process of FIG. 3 moves from a start block to step 50 where terms are tokenized according to a tokenizing policy. For example, symbols may represent sequences of letters, letters and numbers, or letters, numbers and certain punctuation like hyphens or slashes, as needed to capture the important terms in the particular domain or the application.

Next, in step 52 stopwords can be removed according to a stopwords policy. This policy may be not to remove any stopwords, thereby making this an optional step. Stopwords are either terms that do not contribute significantly to the overall topic of the documents—such as conjunctions, articles, pronouns, prepositions—or terms that are frequently used throughout the document, and thus do not serve to topically distinguish one document from another. The optimal set of stopwords (i.e., the stopwords policy) for a document generally is the same set that was used for the original document collection.

Low frequency words, i.e., words occurring relatively few times in the document, can be are removed according to a low frequency words policy, in step 54 of FIG. 3. The low frequency words policy can be based on the original document collection. This policy may be not to remove low frequency words, thereby making this an optional step as well. As many as half of the terms in a typical document occur less than five times. Eliminating these low frequency terms from A is an optional step that can greatly increase computational speeds with a minor loss of information in the term subspace.

The process then moves to step 56 where term normalization, standardization or cannonicalization can be performed according to a term normalization policy. The term normalization policy can be based on the document collection. This policy may be not to perform any term normalization, thereby making this an optional step as well. In some embodiments, term normalization can include, for example, acronym expansion (e.g., "COTS" may be the same as "commercial off-the-shelf") or abbreviation expansion (e.g., "ref." may be the same as "reference"). In other embodiments, term normalization can include standardizing hyphenation or nonhyphenation of selected terms, standardizing numbers to either include or omit commas, removing capitalization, or the like.

Additional term normalization may be specific to the original document collection, for example, in a document collection pertaining to different commercial aircraft models, it might be desirable to group model numbers together, e.g., "747" and "737." The term normalization can include any combination of term normalization, including but not limited to those previously listed. Some of the term normalizations may be performed more than one time. The term normalization policy defines the term normalizations and their order of performance for a given document collection.

In step 58, stemming can be performed according to a stemming policy. The stemming policy can be based on the original document collection. This policy may be not to perform stemming, thereby making this an optional step also. Stemming eliminates conjugate forms of a word, e.g., "es," "ed," and "ing" and keeps only the root word. Care must be taken when performing stemming; for example, it would not be desirable to change "graphics" to "graph" or "Boeing" to "Boe."

Next in step 60, the number of occurrences of each of the relevant terms from the existing document collection within the streaming text data document can be counted to produce a term frequency. Each of the term frequencies can form a term in a term frequency vector that includes the same terms and the same order as the columns of the original document collection matrix or multidimensional term subspace matrix.

Then, in step 62, a statistical transformation can be performed on the term frequency vector according to the statistical transformation policy used in creating the existing document collection matrix. The statistical transformation policy may be not to perform any statistical transformations, thereby making this an optional step. However, improved results may be achieved through statistical transformation, since obtaining a relative frequency and stabilizing the variance of the sampling frequencies make the term frequencies more comparable to each other from one document to another.

For example, the text data vectorizer 16 may perform a proportioning transformation, adjusting a raw term frequency by the sum of the term frequencies of the document in order to obtain a relative term frequency. As another example, the text data vectorizer 16 may apply a transformation algorithm to the data in order to stabilize the variance of the sampling frequencies, making terms with radically different frequencies more comparable. An example of such a transformation algorithm includes taking the arcsin of the square root of the relative term frequencies.

Referring once again to FIG. 1, the vector projector 18 can transform the vector representation of the streaming text data document 34 into a projection in a previously determined multidimensional subspace representing the existing document collection, such as that described in U.S. Pat. No. 6,611,825, entitled "Method and System for Text Mining Using Multidimensional Subspaces," issued to Billheimer et al. on Aug. 26, 2003, and U.S. Pat. No. 6,701,305, entitled "Methods, Apparatus and Computer Program Products for Information Retrieval and Document Classification Utilizing a Multi-Dimensional Subspace," issued to Holt et al., on Mar. 2, 2004, the disclosures of which are hereby incorporated by reference in their entirety. That is, as with existing latent semantic indexing methods, once a decomposed term matrix representation, or term subspace, has been determined for an existing document collection as discussed above, an additional document can be projected in the same subspace using a decomposition methodology such as that discussed above, without modifying the predetermined, or precomputed, multidimensional subspace. This allows the similarities and differences between the new document and the term subspace to be quantified.

The relationship calculator 20 shown in FIG. 1 can calculate a relationship value that represents the similarities or differences between the vector representation generated by the text data vectorizer 16 and the projection generated by the vector projector 18 in the term subspace. For example, the relationship calculator 20 can calculate a residual vector extending from the end point of the projection in the subspace to the end point of the vector representation, which effectively represents the differences between the vector representation and the projection in the subspace. Thus, the length of this vector can be used as a relationship value to represent the relation, or similarities, between the streaming text data document 34 and the existing document collection.

As another example, any measurement of the angle between the term subspace and the vector representation generated by the text data vectorizer 16 can be used as a measure of the relation, commonality or similarity between the streaming text data document and the existing document set. For example, the cosine of that angle, that is, the ratio of the magnitudes of the projection and the vector representation, can be used as the relationship value representing the relatedness, or similarities, of the streaming text data document to the existing document collection. In other embodiments, any suitable measurement method can be utilized to derive a relationship value.

Similarity in content, or relatedness, refers to commonalities in subject matter, topics, or events—not merely commonalities in similar terms. For example, two documents that both include the terms "2007," "Saturn," "vehicle," "project," and "launch" may not be similar in content by the fact that one document could refer to a NASA project with the goal of launching a space exploration vehicle to study the atmosphere of the planet Saturn before the end of the year 2007, while the other document could discuss design efforts by the Saturn Corporation to launch a new automobile model in 2007. Thus, similarity in content refers to documents regarding the same subject matter, topics, or events, which will typically also include common or similar terms as a consequence of content similarity.

Thus, the threshold comparator 24 can compare the relationship value calculated by the relationship calculator 20 to a predetermined threshold in order to make a determination as to whether the streaming text data document 34 is related to the existing document collection. For example, the threshold comparator 24 can compare the ratio of the magnitudes of the projection and the vector representation to a predetermined minimum value. In this case, if the ratio is greater than the minimum value, or threshold, the contents of the newly received streaming text data document are sufficiently similar to the existing document collection to be considered a related document.

As another example, the angle measurement between the term subspace and the vector representation generated by the text data vectorizer 16 can be compared to a maximum threshold angle. In this case, if the angle between the vector representation and the subspace is less than the threshold angle, the newly received streaming text data document may be considered a related document.

Depending at least in part on the outcome of the threshold comparison performed by the threshold comparator 24, the streaming text data comparator 10 may intercalate (i.e., "fold in," add or append) the newly received streaming text data document 34 into the existing document collection. If the newly received streaming text data document 34 is related to the existing document collection, the intercalator 26 can map the streaming text data document 34 into the precomputed multidimensional term subspace and assign the resulting coordinates to the streaming text data document 34. Effectively, the previously defined term subspace of the existing document collection can be augmented with the projection that was generated by the vector projector 18. The definition of the term subspace is not changed, modified, or updated by this process; instead, the precomputed term subspace representing the document collection is maintained intact, and the projection representing the streaming text data document 34 is simply aggregated with the existing document collection.

FIG. 4 is a flowchart illustrating a sequence of steps that can be performed by the streaming text data comparator 10 of FIG. 1 in order to perform real-time text data mining on streaming text data. The process can begin by proceeding to step number 64, "receive document," in which the streaming text data comparator 10 can receive a streaming text data document from any of a number of sources, such as email, news, websites, or the like, over a network. Once a document—or unit of streaming text data—has been received, then the process continues to step 66, "compute vector," in which a vector representation of the streaming text data document can be computed. For example, the streaming text data comparator 10 can follow the steps shown in FIG. 3, as described above, in order to generate a term frequency vector and statistically transform the term frequency vector into a suitable vector representation of the streaming text data document.

Then in step 68, "project in subspace," the vector representation can be projected in the multidimensional term subspace derived from the original document collection. After creating a projection in the subspace, the streaming text data comparator 10 can compute a residual vector in step 70, "compute residual," that quantifies the difference between the vector representation of the streaming text data document and the subspace representing the original document collection.

Next, in step 72, the residual vector can be compared to a threshold value to determine whether the streaming text data document is related to the original document collection. If the streaming text data document is related to the original document collection, the streaming text data comparator 10 can intercalate the streaming text data document into the document collection in step 74. That is, the streaming text data comparator 10 can intercalate or append the projection into the precomputed term subspace without modifying or updating the subspace.

Otherwise, in Step 76, if the newly received streaming text data document is not related to the original document collection—that is, the residual is greater than the threshold value—the streaming text data comparator 10 can store, or accumulate the unrelated document. In alternative embodiments, the unrelated document may be ignored or automatically deleted, or user input may be requested to determine an appropriate action.

After performing step 74 or 76, the process proceeds to step 78, in which the streaming text data comparator 10 determines whether the process is to continue. If the process has reached an end, or an end command has been received in step 78, the process stops. Otherwise if the process is to continue, or an end command has not been received, the streaming text data comparator 10 can verify whether a new document has been received in step 80. If a new document has been received, the streaming text data comparator can return to step 64, "receive document," and can continue through an additional cycle of the process. However, if a new document has not been received in step 80, the streaming text data comparator can continue to step 82, "hold," and wait during a predetermined time period before returning to step 78 to determine whether an end command has been received, and so on. Thus, the streaming text data comparator 10 can perform real-time streaming text data mining on an ongoing basis.

FIGS. 1-4 are block diagrams, schematic diagrams and flowcharts of methods, apparatuses and computer program products according to various embodiments of the present invention. It will be understood that each block or step of the block diagram, flowchart and control flow illustrations, and combinations of blocks in the block diagram, flowchart and control flow illustrations, can be implemented by computer program instructions or other means. Although computer program instructions are discussed, an apparatus according to the present invention can include other means, such as hardware or some combination of hardware and software, including one or more processors or controllers, for performing the information retrieval or document classification.

In this regard, FIG. 1 depicts the apparatus of one embodiment including several of the key components of a general purpose computer by which an embodiment of the present invention may be implemented. Those of ordinary skill in the art will appreciate that a computer can include many more components than those shown in FIG. 1. However, it is not necessary that all of these generally conventional components be shown in order to disclose an illustrative embodiment for practicing the invention. The general purpose computer can include a processing unit 12 and a system memory 14, which may include random access memory (RAM) and read-only memory (ROM). The computer also may include nonvolatile storage memory, such as a hard disk drive, where additional data can be stored.

An embodiment of the present invention can also include one or more input or output devices 30, such as a mouse, keyboard, monitor, and the like. A display can be provided for viewing text and graphical data, as well as a user interface to allow a user to request text mining operations. Furthermore, an embodiment of the present invention may be connected to one or more remote computers via a network interface. The connection may be over a local area network (LAN) wide area network (WAN), and includes all of the necessary circuitry for such a connection. In one embodiment of the present invention, the document collection includes documents received over the Internet. Other embodiments are possible, including: a local document collection, i.e., all documents on one computer, documents stored on a server or a client in a network environment, etc.

Typically, computer program instructions may be loaded onto the computer or other general purpose programmable machine to produce a specialized machine, such that the instructions which execute on the computer or other programmable machine create means for implementing the functions specified in the block diagrams, schematic diagrams or flowcharts. Such computer program instructions may also be stored in a computer-readable medium that when loaded into a computer or other programmable machine can direct the machine to function in a particular manner, such that the instructions stored in the computer-readable medium produce an article of manufacture including instruction means that implement the function specified in the block diagrams, schematic diagrams or flowcharts.

In addition, the computer program instructions may be loaded onto a computer or other programmable machine to cause a series of operational steps to be performed by the computer or other programmable apparatus to produce a computer-implemented process, such that the instructions that execute on the computer or other programmable machine provide steps for implementing the functions specified in the block diagram, schematic diagram or flowchart block or step.

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagrams, schematic diagrams or flowcharts, as well as combinations of blocks or steps, can be implemented by special purpose hardware-based computer systems, or combinations of special purpose hardware and computer instructions, that perform the specified functions or steps.

For example, a data input software tool of a search engine application is an example means for receiving a query including one or more search terms. Similar software tools of applications of embodiments of the present invention are means for performing the specified functions. For example, an embodiment of the present invention may include computer software for interfacing a processing element with a user controlled input device, such as a mouse, keyboard, touch screen display, scanner, or the like. An output of an embodiment of the present invention may include, for example, a combination of display software, video card hardware, and display hardware. A processing element may include a controller or microprocessor, such as a central processing unit (CPU), arithmetic logic unit (ALU), or control unit.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method of comparing a unit of streaming text data to an existing document collection, comprising:
   constructing a term-by-document matrix of the existing document collection;
   decomposing the term-by-document matrix into a term basis matrix, a weights matrix, and a document basis matrix;
   determining a multidimensional term subspace of the term basis matrix;
   computing a vector representation of the unit of streaming text data;
   transforming the vector representation into a projection into the predetermined multidimensional term subspace;
   calculating a relationship value indicative of a relationship between the vector representation and the predetermined multidimensional term subspace in real-time, wherein the relationship value is a residual vector that quantifies the difference between the vector representation of the streaming text data document and the subspace representing the original document collection; and
   appending the projection of the unit of streaming text data to the existing document collection represented by the predetermined multidimensional term subspace, the existing document collection being represented by a quantity of vectors corresponding to an equivalent quantity of documents in the existing document collection, the appending of the projection of the streaming text data to the existing document collection being performed without determining a new multidimensional term subspace and without adding additional terms not originally included in the term basis matrix, the appending being performed when it is determined that a relationship exists between the streaming text data and the predetermined multidimensional term subspace, wherein the relationship exists when the residual vector is less than a threshold.

2. The method of claim 1, wherein the unit of streaming text data includes a document.

3. The method of clam 1, wherein the step of computing further comprises statistically transforming the term frequency according to a predetermined statistical transformation policy.

4. The method of claim 1, wherein the relationship value is based at least in part on a distance between the projection and the vector representation.

5. The method of claim 1, wherein the relationship value is based at least in part on an angle between the projection and the vector representation.

6. The method of claim 1, wherein the relationship value is based at least in part on a magnitude of the projection.

7. The method of claim 1, further comprising receiving the unit of streaming text data over a communication network.

8. The method of claim 7, wherein the step of receiving further comprises receiving the unit of streaming text data by way of one selected from the following: a hypertext transfer protocol (HTTP), a secure hypertext transfer protocol (HTTPS), a network news transfer protocol (NNTP), a post office protocol (POP), an Internet message access protocol (IMAP), a file transfer protocol (FTP), an Internet relay chat protocol (IRC) and a proprietary protocol.

9. The method of claim 1, further comprising comparing the relationship value to a predetermined threshold value.

10. A computer program product for comparing a unit of streaming text data to an existing document collection in real-time, including a computer-readable medium encoded with instructions configured to be executed by a processor in order to perform predetermined operations comprising:

constructing a term-by-document matrix of the existing document collection;

decomposing the term-by-document matrix into a term basis matrix, a weights matrix, and a document basis matrix;

determining a multidimensional term subspace of the term basis matrix;

computing a vector representation of the unit of streaming text data in real-time;

transforming the vector representation into a projection into the predetermined multidimensional term subspace in real-time;

calculating a relationship value indicative of the relationship between the vector representation and the predetermined multidimensional term subspace in real-time, wherein the relationship value is a residual vector that quantifies the difference between the vector representation of the streaming text data document and the subspace representing the original document collection; and appending the projection of the unit of streaming text data to the existing document collection represented by the predetermined multidimensional term subspace, the existing document collection being represented by a quantity of vectors corresponding to an equivalent quantity of documents in the existing document collection, the appending being performed without determining a new multidimensional term subspace and without adding additional terms not originally included in the term basis matrix, the appending being performed when it is determined that a relationship exists between the streaming text data and the predetermined multidimensional term subspace, wherein the relationship exists when the residual vector is less than a threshold.

11. The computer program product of claim 10, wherein the unit of streaming text data includes a document.

12. The computer program product of claim 10, wherein the step of computing further comprises statistically transforming the term frequency according to a predetermined statistical transformation policy.

13. The computer program product of claim 10, wherein the relationship value is based at least in part on a distance between the projection and the vector representation.

14. The computer program product of claim 10, wherein the relationship value is based at least in part on an angle between the projection and the vector representation.

15. The computer program product of claim 10, wherein the relationship value is based at least in part on a magnitude of the projection.

16. The computer program product of claim 10, wherein the predetermined operations further comprise receiving the unit of streaming text data over a communication network.

17. The computer program product of claim 16, wherein the step of receiving further comprises receiving the unit of streaming text data by way of one selected from the following: a hypertext transfer protocol (HTTP), a secure hypertext transfer protocol (HTTPS), a network news transfer protocol (NNTP), a post office protocol (POP), an Internet message access protocol (IMAP), a file transfer protocol (FTP), an Internet relay chat protocol (IRC) and a proprietary protocol.

18. The computer program product of claim 10, wherein the predetermined operations further comprise comparing the relationship value to a predetermined threshold value.

19. A streaming text data comparator, comprising:

a streaming text data vectorizer configured to compute a vector representation of a unit of streaming text data at a rate equivalent to the transmission rate of the data;

a vector projector configured to transform the vector representation into a projection into a predetermined multidimensional term subspace representing an existing document collection, the multidimensional term subspace being based on a term basis matrix of a decomposed term-by-document matrix of the existing document collection; and a relationship calculator configured to calculate a relationship value indicative of a relationship between the vector representation and the predetermined multidimensional term subspace at a rate equivalent to the transmission rate of the data, wherein the relationship value is a residual vector that quantifies the difference between the vector representation of the streaming text data document and the subspace representing the original document collection, wherein the relationship calculator is configured to append the projection of the vector representation of the unit of streaming text data to the existing document collection without determining a new multidimensional term subspace and without adding additional terms not originally included in the term basis matrix, the existing document collection being represented by a quantity of vectors corresponding to an equivalent quantity of documents in the existing document collection, the appending being performed when it is determined that a relationship exists between the streaming text data and the predetermined multidimensional term subspace, wherein the relationship exists when the residual vector is less than a threshold;

wherein the unit of streaming text data includes a document, and one or more processors, wherein said streaming text vectorizer, said vector projector, and said relationship calculator are operable using said one or more processors.

20. The streaming text data comparator of claim 19, wherein the streaming text data vectorizer is further configured to statistically transform the term frequency according to a predetermined statistical transformation policy.

21. The streaming text data comparator of claim 19, wherein the relationship value is based at least in part on a distance between the projection and the vector representation.

22. The streaming text data comparator of claim 19, wherein the relationship value is based at least in part on an angle between the projection and the vector representation.

23. The streaming text data comparator of claim 19, wherein the relationship value is based at least in part on a magnitude of the projection.

24. The streaming text data comparator of claim 19, further comprising a streaming text data receiver configured to receive the streaming text data over a communication network.

25. The streaming text data comparator of claim 24, wherein the streaming text data receiver is further configured to receive the unit of streaming text data by way of one selected from the following: a hypertext transfer protocol (HTTP), a secure hypertext transfer protocol (HTTPS), a network news transfer protocol (NNTP), a post office protocol (POP), an Internet message access protocol (IMAP), a file transfer protocol (FTP), an Internet relay chat protocol (IRC) and a proprietary protocol.

26. The streaming text data comparator of claim 19, further comprising a threshold comparator configured to compare the relationship value to a predetermined threshold value.

27. The streaming text data comparator of claim 26, further comprising a streaming text data intercalator configured to intercalate the unit of streaming text data into the document collection based at least in part on a result of the comparison.

28. The comparator of claim 19, wherein the streaming text data vectorizer, the vector projector and relationship calculator are executable on a computer readable media.

29. The method of claim 1, wherein the computing comprises tokenizing a first term according to a predetermined tokenizing policy, removing a second term according to a predetermined stopword policy, removing a third term according to a predetermined low frequency term policy, normalizing a fourth term according to a predetermined normalization policy, and stemming a fifth term according to a predetermined stemming policy.

30. The computer program product of claim 10, wherein the computing comprises tokenizing a first term according to a predetermined tokenizing policy, removing a second term according to a predetermined stopword policy, removing a third term according to a predetermined low frequency term policy, normalizing a fourth term according to a predetermined normalization policy, and stemming a fifth term according to a predetermined stemming policy.

31. The streaming text data comparator of claim 19, wherein the streaming text data vectorizer is configured to tokenize a first term according to a predetermined tokenizing policy, remove a second term according to a predetermined stopword policy, remove a third term according to a predetermined low frequency term policy, normalize a fourth term according to a predetermined normalization policy, and stem a fifth term according to a predetermined stemming policy.

* * * * *